United States Patent [19]

Strenglein

[11] 3,806,905
[45] Apr. 23, 1974

[54] TRANSDUCER AND CONDITION MONITOR

[75] Inventor: Harry F. Strenglein, Clearwater, Fla.

[73] Assignee: Sperry Rand Corporation, New York, N.Y.

[22] Filed: Sept. 8, 1971

[21] Appl. No.: 178,582

[52] U.S. Cl.................. 340/224, 340/58, 343/6.8 R
[51] Int. Cl............................................ G08b 23/00
[58] Field of Search ............... 325/8, 113, 152, 440; 340/58, 60, 152 T, 224; 343/6.5 R, 6.5 SS, 6.8 R

[56] References Cited
UNITED STATES PATENTS

| | | | |
|---|---|---|---|
| 2,193,102 | 3/1940 | Koch............................ | 340/224 UX |
| 2,860,321 | 11/1958 | Strickland et al...................... | 340/58 |
| 2,894,246 | 7/1959 | DeGraffenried.................. | 340/52 R |
| 3,022,492 | 2/1962 | Kleist et al...................... | 343/6.5 SS |
| 3,092,806 | 6/1963 | Field..................................... | 340/58 |
| 3,137,847 | 6/1964 | Kleist.............................. | 343/6.5 SS |
| 3,172,101 | 3/1965 | Kingsford-Smith............. | 343/6.5 SS |
| 3,182,314 | 5/1965 | Kleist et al...................... | 343/6.5 SS |
| 3,440,633 | 4/1969 | Vinding........................... | 343/6.5 SS |
| 3,018,475 | 1/1962 | Kleist et al....................... | 325/8 UX |
| 3,493,955 | 2/1970 | Minasy............................ | 340/258 R |

Primary Examiner—John W. Caldwell
Assistant Examiner—Kenneth N. Leimer
Attorney, Agent, or Firm—S. C. Yeaton

[57] ABSTRACT

The condition monitor provides information about the state of a monitored dual state device having, for example, possible satisfactory and unsatisfactory conditions. Use is made of a passive transducer element powered by space-transmitted radio frequency signals of first and second carrier frequencies. In the unsatisfactory condition of the monitored device, the passive transducer emits a modulated carrier signal, which signal is detected for the operation of a suitable alarm or remedial control. In the normal or satisfactory condition of the monitored device, the passive transducer inhibits production of the modulated carrier signal.

18 Claims, 7 Drawing Figures

INVENTOR
HARRY F. STRENGLEIN
BY
ATTORNEY

INVENTOR
HARRY F. STRENGLEIN
BY

ATTORNEY

TRANSDUCER AND CONDITION MONITOR

BACKGROUND OF THE INVENTION

1. Field of the Invention

The invention pertains to condition monitoring means for detecting and indicating the state of a dual state device and more particularly for indicating the condition of a monitored device within or upon which a passive transducer is itself mounted without any requirement of physical elements for directly conducting a supply of electrical power to the transducer. An abnormal state of the monitored device is indicated by the radiation of a modulated carrier signal by the passive transducer.

2. Description of the Prior Art

There has been a general need for means for evaluating a condition or conditions of elements of rotatable and translatable machinery, whether or not in actual motion, in an inexpensive and efficient manner. Prior art solutions to the problem have generally been complex, since electrical or other power must be supplied from a reliable source to the moving monitoring device by slip rings or some other such physical agency. Further, the condition monitoring output signal must similarly be coupled from the moving machinery element back to a relatively stationary location for providing an alarm to be acted upon by an operator or for direct operation of an automatic control.

For example, large trucks and other such vehicles, which often have as many as 12 tires, may be sources of maximum profit when maintained in operation without interruption over maximum periods of time. Depot checks of tire inflation are beneficial in reducing problems with tires between depots, which problems not only involve lost operating time for the truck, but unprofitable use of the time of personnel, as well. Serious deflation of a tire in service not only leads to rapid tire wear, but rapid heating of the tire body at high speeds may cause it to ignite, and even that condition may not be noticed immediately by the truck operator. Such fires are often stubborn fires and may result in the total loss of the vehicle and its valuable cargo.

Prior art devices responsive, for example, to tire pressure have included a variety of electrical and mechanical devices mounted on the vehicle for signalling to the truck operator or to other personnel a significant departure in tire pressure from a normal value. As suggested above, these devices have required slip ring or equivalent systems to supply power to the pressure monitoring device, and additional such elements to deliver the monitor output signal for use by the truck inspector or operator. Such devices wear rapidly and are highly unreliable under all but most ideally clean and dry conditions. Also unsatisfactory are arrangements responsive to tilting of a wheel or axle due to loss of pressure in a tire. Such devices are undesirably responsive both to the cross section of the roadway and to the load distribution within the vehicle.

It will be appreciated by those skilled in the art of monitoring the operating conditions of kinetic elements of other types of machines that kindred problems arise in many different types of such machines that are not adequately solved by existing condition monitoring equipment. Therefore, there is similarly present a need for providing efficient and effective monitoring apparatus for various types of kinetic elements associated with various kinds of machines for monitoring their various operating characteristics, such as pressure, speed, acceleration, or the like.

SUMMARY OF THE INVENTION

The present invention relates to condition monitoring apparatus for providing information as to the state of a dual state device having, for example, a satisfactory condition and a possible unsatisfactory condition. According to the invention, the condition monitor provides an indication of the condition of the monitored device by employing a passive transducer attached directly to the device to be monitored. The novel transducer does not require the use of certain prior art physical elements, such as for conducting an electrical current for supplying power to the transducer. Where, for example, tire pressure is to be monitored, use is made of a pressure transducer powered by space-transmitted radio frequency carrier signals supplied by a remotely located generator. In the unsatisfactory condition of the monitored device, such as in the instance of a low tire pressure condition, the passive transducer emits a signal that is a modulated version of one of the incident carrier frequency signals, which modulated signal is detected for the actuation of an alarm or for the operation of a suitable control device.

DESCRIPTION OF THE PREFERRED EMBODIMENTS

Figure 1:
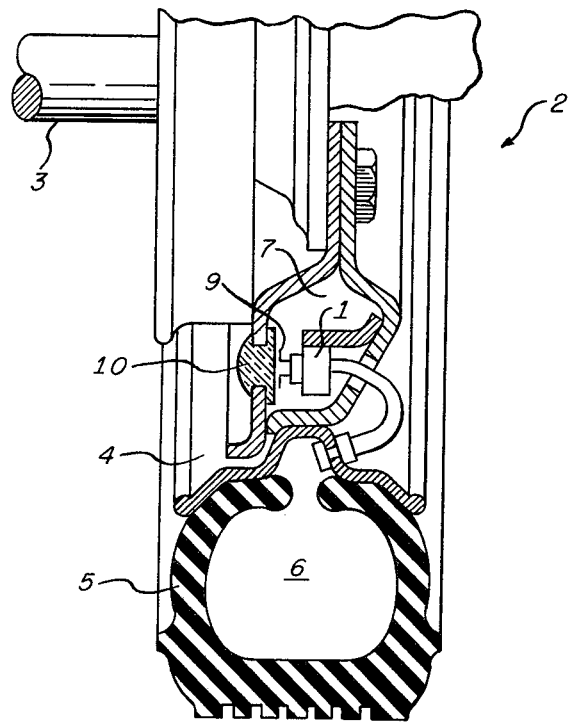
FIG. 1 is an elevation view, partly in cross section, of apparatus employing the novel condition monitor.

In FIG. 1, the novel transducer 1 of the present invention is illustrated in use in a system for monitoring the condition of a rotating machine element in the form of a wheel and tire assembly 2, such as may be employed on a vehicle for hauling cargo. The axle 3, wheel 4, and tire 5 of assembly 2 may be substantially conventional elements. While it will be understood by those skilled in the art that the present invention has many other applications, it is illustrated in FIG. 1 in an environment in which it monitors the gas pressure level within the interior 6 of the vehicle tire 5. For this typical purpose, the transducer 1 is conveniently supported in an interior region 7 of the wheel 4. Since it is to monitor the interior gas pressure condition of tire 5, transducer 1 is coupled through a tubular coupling 8 connecting the transducer 1 to the interior 6 of tire 5. If desired, the tubular coupling 8 may be attached to a tee adapter fitted on the conventional tire valve stem of tire 5.

In FIG. 1, transducer 1 is arranged to transmit a high frequency signal emitted by antenna 9 when the gas pressure within tire 5 reaches an unsatisfactory low condition. Antenna 9 is illustrated, for purposes of convenience in FIG. 1, as a simple dipole antenna, though it will be understood by those skilled in the art that other kinds of high frequency antennas may be employed for the purpose. Antenna 9 may be a unidirectional antenna, so that it may be safely spaced from a reflecting metal surface, or it may be bidirectional, permitting its illumination from either side. When antenna 9 is, for instance emitting signals that are transmitted outside of wheel 5 through a window 10 sealed adjacent antenna 9 at an appropriate location in wheel 4 as shown in FIG. 1, it is to be assumed that antenna 9 may be in communication with one or more cooperating antennas such as may be located, for example, in a central portion below the vehicle body with respect to its several wheels or elsewhere. In such a typical configuration it is anticipated that cooperating transmitter and receiver equipment such as illustrated in FIGS. 3 and 4 will also be located aboard the vehicle.

Figure 2:
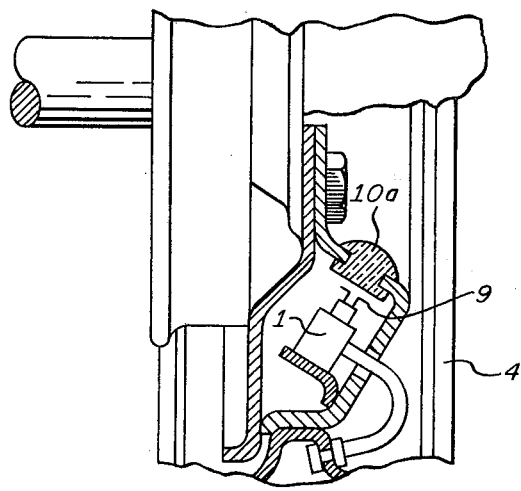
FIG. 2 is a fragmentary view of an alternative arrangement of a portion of the apparatus of FIG. 1.

FIG. 2 represents a preferred arrangement of the transducer within a vehicle wheel for use with a transmitter-receiver interrogating system located at a freight depot, truck rental agency, or wayside check point. In FIG. 2, antenna 9 is directed to radiate or receive energy through a window 10a in an outer wall of the wheel 4. In this configuration, it is expected that the transducer 1 will operate cooperatively with transmitter and receiver apparatus, such as illustrated in FIGS. 3 and 4, but which transmitter and receiver apparatus may be located, for instance, at a road side check point or maintenance or other area. Such check points may be installed at convenient intervals along a truck highway, for example.

Figure 3:
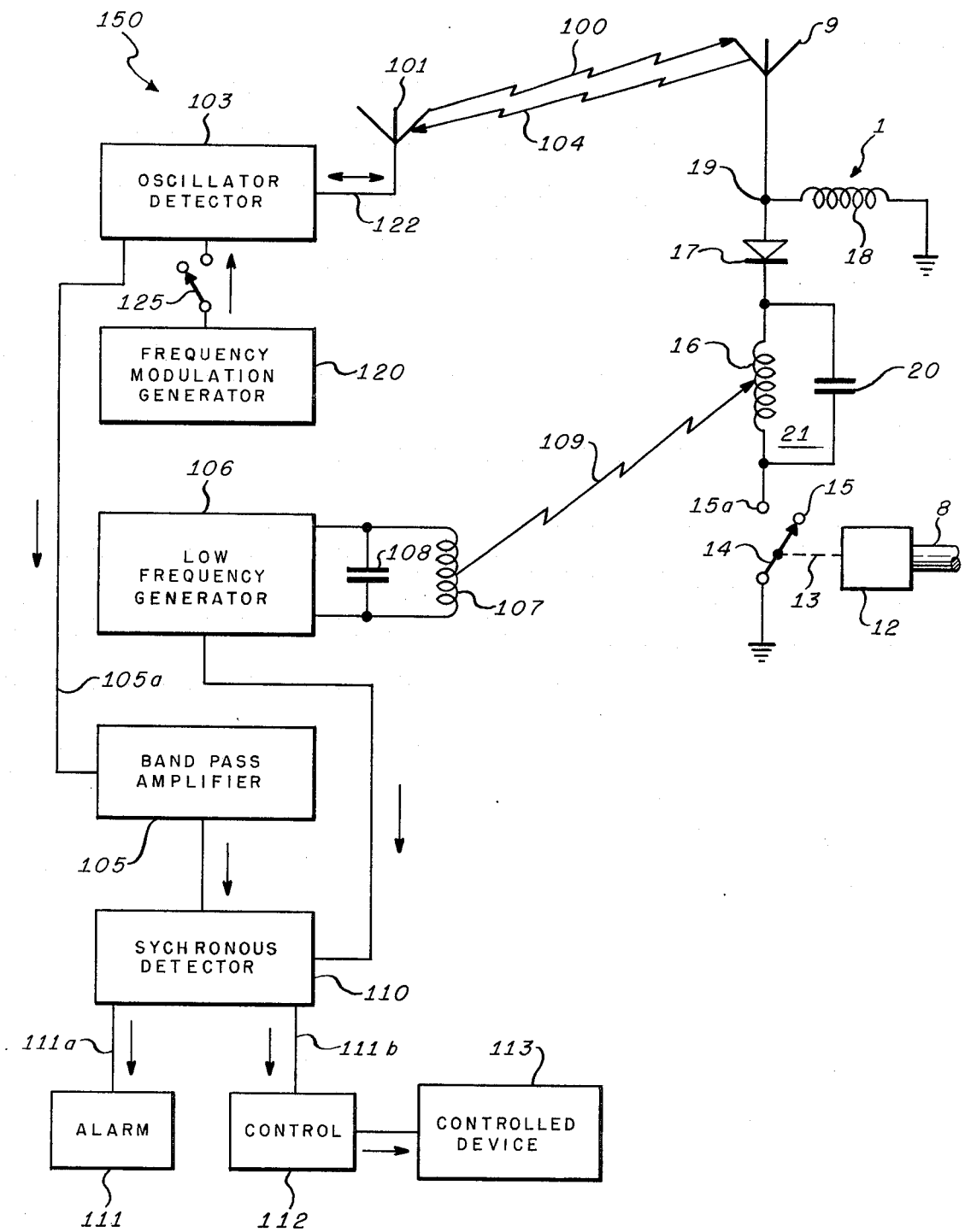
FIG. 3 is a block diagram of a preferred embodiment of the transducer system and of a transmitter-receiver system for monitoring purposes.
Figure 4:
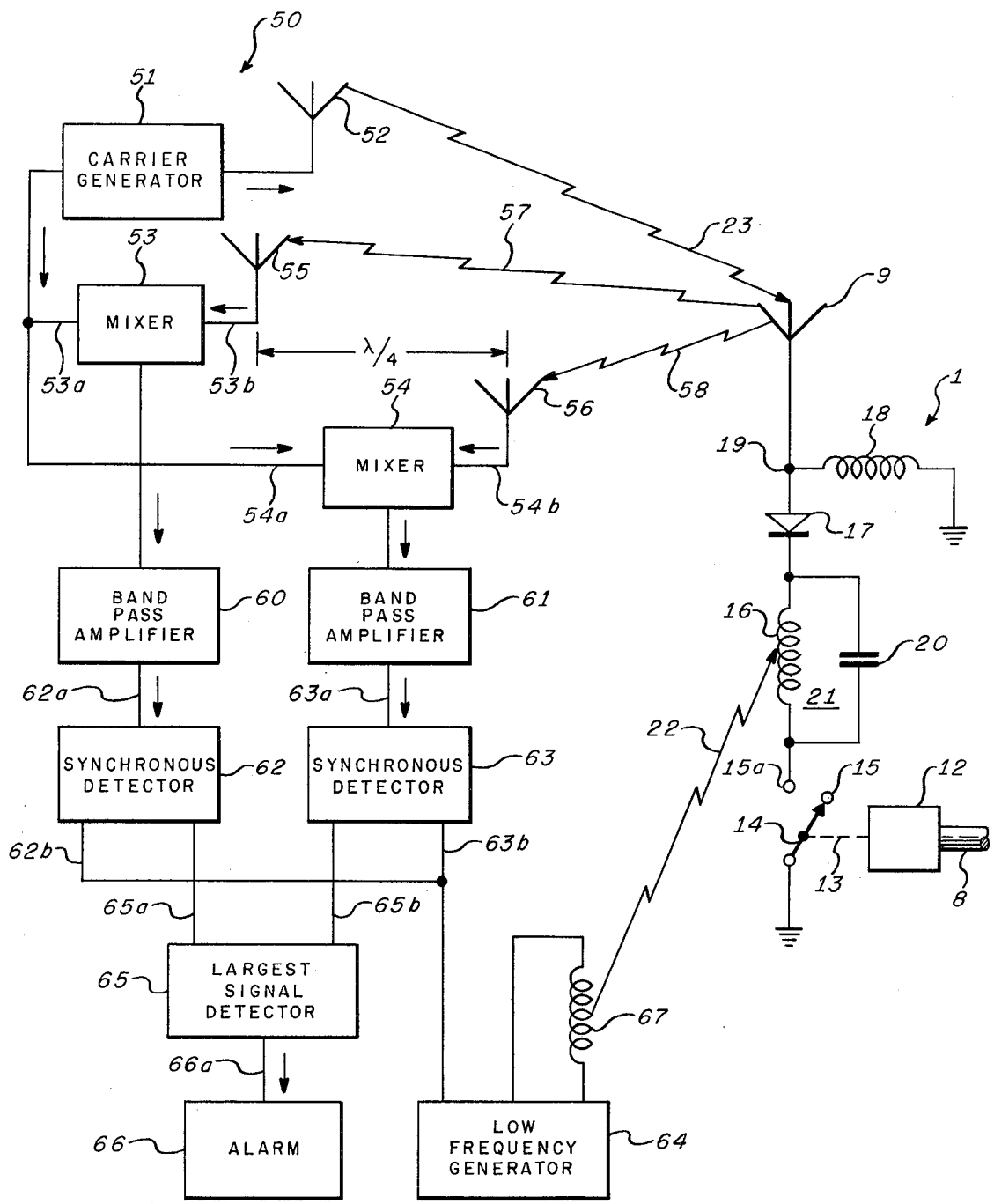
FIG. 4 is a block diagram of an alternative embodiment of the condition monitoring system of FIG. 3.

The transducer 1 of FIGS. 1 and 2 is shown in greater detail at the right sides of FIGS. 3 and 4. It is seen in FIG. 3 that the tubular coupling 8 is connected so as to supply gas pressure to the interior of a pressure sensing switch 12 which may be of a conventional type including a deformable diaphragm or other pressure sensing element adapted for moving a mechanical link 13, in turn to move switch blade 14 according to the pressure within the interior of tire 5. For example, if the gas pressure within tire 5 is adequate, switch blade 14 will be in contact with the unused switch contact 15. However, if the pressure within tire 5 and consequently within the tubular coupling 8 falls below a predetermined value, motion of the pressure sensing element within sensor 12 will move switch blade 14 to the contact 15a.

The transducer 1 of FIG. 3, when switch blade 14 is touching contact 15a, includes in series circuit an inductive element 16 which, as will be seen, may serve as a low frequency receiver antenna, a diode or rectifier 17, and an inductance 18 for completing a direct current path for rectified or other current flow if switch 14 is in its conducting position. Coupled to junction 19 between diode 17 and inductance 18 is a high frequency carrier antenna 9 such as shown in FIGS. 1 and 2. Capacitor 20 is connected across inductance 16 for providing a resonant circuit 21 for resonating low frequency signals coupled to inductance 16 when it operates as an antenna. In a typical example, the carrier signal received by antenna 9 over space path 100 may be of the order of 1 to 10 GHz, while the signal received by resonant antenna 16 over space path 109 may be of the order of 1 mHz.

In the preferred system of FIG. 3, the transmitter-receiver system 150 cooperates with the wheel-mounted transducer 1, the transmitter carrier generator or oscillator detector 150 being arranged to excite antenna 101 which illuminates transducer antenna 9 via space path 100. Antenna 101 may transmit interrogation signals to several similar transducer antennas, may be tuned to the carrier frequency, and may take the form of any of several known types of high frequency antennas. For example, if the transmitter receiver of FIG. 3 is to be located at a road side check station or depot, a directional antenna may be used as antenna 101 so oriented or orientable that it illuminates, for example, the window 10a, thus exciting antenna 9 in FIG. 2. On the other hand, if the transmitter-receiver system of FIG. 3 is carried on a truck all of whose tires are being continuously monitored, a conventional omnidirectional antenna 101 may be located on the truck body so that the interior sides of all wheels of the vehicle may be illuminated by its radiation.

The high frequency carrier transmitted over path 100 by antenna 101 is supplied by a conventional high frequency oscillator 103 of the type which also functions as a self-oscillating detector for any carrier signals re-radiated into antenna 101, as by space path 104. Any such detected signals are supplied via conductor 105a to a band pass amplifier 105 adjusted to pass low frequency modulation signals, such as signals of 1 mHz frequency.

The low frequency modulation signals are imposed on the signal of path 104 because of the presence of the low frequency generator 106. The 1 mHz generator 106 excites the inductance antenna 107, which may be resonated by capacitor 108, so that antenna 107 radiates energy along space path 109 to excite the transducer antenna 16 and resonator 21. The 1 mHz low frequency signal is also supplied to a conventional synchronous detector 110 along with the output of band pass amplifier 105.

The presence of switch blade 14 on contact 15a produces an output on lead 111a as a result of the action of synchronous detector 110 and causes the operation of alarm 111, which may be a conventional latching or other alarm device. It is further within the scope of the invention that such a monitoring signal may also be supplied as by lead 111b to an appropriate actuator to exercise remedial control over an adverse situation. For example, in the instance of a pneumatically tired vehicle, actuator or control 112 may cause operation of a control device such as a conventional hydraulic braking system or other controlled device 113. If desired, a suitable time delay (not shown) may be injected in the circuit before control 112, giving the operator time to take corrective measures, if he is able to do, before automatic remedial control is exercised.

As previously noted, any modulated high frequency carrier energy collected by antenna 101 is coupled into the single-port oscillator-detector 103, causing the level of amplified oscillations within oscillator-detector 103 to vary for a time period generally related to the modulated amplitude and time duration of the received carrier signal. It is to be understood that single-port oscillator-detector 103 may be any of several conventional known oscillator-detector devices or circuits, including an appropriately adjusted avalanche transit time, high frequency diode oscillator of the type which is well known in the art to act as a detector when biased at an oscillating condition. The single-port device 103 operates in a conventional manner in the invention both as a detector and as oscillator. For example, when the active diode of the oscillator is biased near a point at which oscillations would increase, the added voltage across the oscillator diode when a high frequency carrier is injected from antenna 101 produces growing or varying oscillations because of conventional gain mechanisms inherent in the oscillator. They can be detected or measured on lead 105a by observing the level of the diode bias current. Likewise, when the oscillator diode is biased near a point at which oscillations would grow, a slight elevation of the bias voltage will cause the circuit to increase its level of high frequency oscillation. While conventional high frequency avalanche diode oscillators represent one form of negative resistance device suitable for dual mode operation as oscillators and detectors, other suitable devices are present in the prior art, including Gunn and tunnel diode oscillators and other amplifier or oscillator devices.

Since the particular form of the oscillator-detector device 103 is not necessarily a part of the present invention, a discussion of details of its structure is not required for an understanding of the invention. However, single-tuned diode oscillator or amplifier devices suitable for use in the invention are described liberally in the literature and in the C. T. Rucker, J. W. Amos U.S. Pat. application Ser. No. 853,725, filed Aug. 28, 1969 for a "Microwave Negative Resistance Transducer", issued as U.S. Pat. No. 3,605,034 Sep. 14, 1971 and assigned to the Sperry Rand Corporation.

In the use of the apparatus of FIG. 3, a continuous output on lead 111a is generally available, especially when the wheel or other element on which transducer 1 is mounted is in actual motion, even though its rate of motion may be relatively slow. The effective round trip path length 100 plus 104 is varied because of the wheel rotation, for instance, and is rapid enough so that the blind zones of the single channel autodyne system of FIG. 4 cannot persist long enough to prevent operation of alarm 111 at least during some portion of the wheel's traverse of the radiation field of the interrogating antenna 101.

Wherever the inherent variation of the effective path length 100 plus 104 does not have proper characteristics for operation of a conventional simple device as alarm 111, a conventional latching alarm may be employed which retains its alarm condition once initiated until manually reset. Alternatively, the switch 125 of FIG. 3 may be closed so that the output of frequency modulation generator 120 is applied to frequency modulate the output of the oscillator of device 103. The effect of the frequency modulation, which may be, for example, at a low rate such as a 100 Hz rate, is to modulate the apparent round trip space path length including paths 100 and 104 between the interrogator antenna 101 and the transducer antenna 9 through substantially a 90 angular degree sweep. Thus, any insensitive quadrature condition of the autodyne receiver is present only for very small instants of time and is not disturbing. In lieu of the frequency modulator 120, its desired effect can be produced by the use of a swept phase shifter such as may be placed in the transmission line 122 connecting oscillator 103 to antenna 101.

The versatility of the novel condition transponder is further enhanced by the fact that it may be employed to transmit analog data from transponder 1 of FIG. 3. If capacitor 20 represents a variable analog condenser pick off, and the frequency of low frequency oscillator 106 is swept in saw tooth fashion, then transducer 1 will respond strongly when the low frequency signal corresponds to the resonant frequency of resonant circuit 21. The frequency at which the response occurs is clearly a measure of the displacement between the plates of capacitor 20, and is therefore a measure, for example, of actual pressure.

Figure 5:
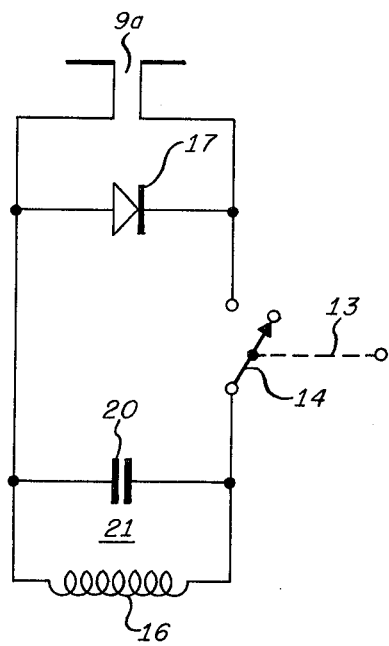
FIGS. 5, 6, and 7 are alternative forms of the transducer 1 of FIGS. 3 and 4.
Figure 6:
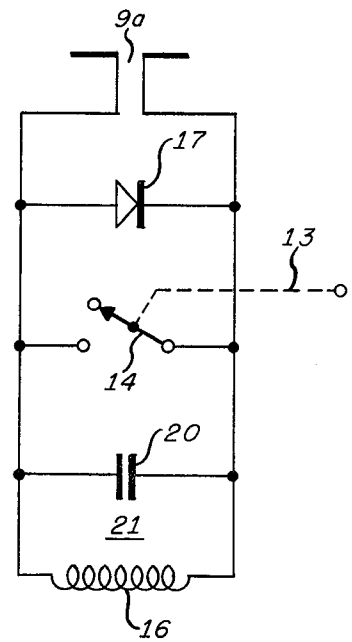

The alternative system of FIG. 4 may also be generally employed, since any blind zone problem is again eliminated by employing two balanced receiver channels including mixers 53 and 54. The transducer 1 of the FIG. 3 system is again used in the FIG. 4 system and therefore its components are identified by the same reference numerals in FIGS. 3 and 4; alternatively, the transducers of FIGS. 5, 6, or 7 may be used in the systems of FIGS. 3 and 4. These common elements include tubular coupling 8, high frequency antenna 9, pressure or other condition sensing switch 12, mechanical link 13, switch blade 14, switch contacts 15 and 15a, inductive or low frequency antenna 16, diode rectifier 17, inductance 18, and resonating capacitor 20. Operation of the FIG. 4 transducer 1 is the same as has been described in connection with FIG. 3.

In the transmitter receiver 50 of FIG. 4, the carrier signal generated by carrier source 51 is also supplied in balanced fashion to first inputs 53a and 54a of respective high frequency signal mixers 53 and 54. Second inputs 53b and 54b of the respective mixers 53 and 54 are coupled to the respective receiver antennas 55 and 56. Antennas 55 and 56 are arranged to be spaced substantially at a relative displacement of $\lambda/4$ with respect to transponder antenna 9, as a solution to the blind zone problem, if present, and may, like antenna 52, be omnidirectional tuned antennas for receiving signals rebroadcast by transponder antennas, such as antenna 9, placed in one or in several locations. As illustrated in FIG. 4, the space path 57 from antenna 9 to antenna 55 is thus $\lambda/4$ longer than space path 58 between antenna 9 and antenna 56. Here, $\lambda$ is the operating space wave length for the carrier signal generated by carrier generator 51, which signal may be a microwave or other high frequency signal.

Mixer 53 supplies an output through band pass amplifier 60, which amplifier 60 will pass 1 mHz signals for the example assumed. Similar signals will be supplied as an output through band pass amplifier 61, the respective outputs of band pass amplifiers 60 and 61 being connected to respective first inputs 62a and 63a of conventional synchronous detectors 62 and 63.

The respective second inputs 62b and 63b of synchronous detectors 62 and 63 are supplied from low frequency signal generator 64. For the example being discussed, the output of low frequency generator 64 may be substantially of 1 mHz frequency and is broadcast over path 22 by inductive antenna 67 to be received by the transducer inductive antenna 16.

As noted above, there will be carrier frequency signals received by receiver antennas 55 and 56 when switch 14 is contacting contact 15a, thus indicating an unsatisfactory state of the element being monitored. Under such a circumstance, and because of the $\lambda/4$ offset of antennas 55 and 56, the balanced circuit including mixers 53 and 54, amplifiers 60 and 61, and synchronous detectors 62 and 63 will yield continuous unidirectional outputs on the input leads 65a and 65b connected to detector 65. Detector 65 is a conventional circuit of the kind adapted to detect and compare the levels of signals on leads 65a and 65b and to yield a definite output on lead 66a if either such signal arises above a predetermined value. Such a signal may be used to operate alarm 66.

Any low-frequency amplitude modulated signal received by antennas 55 and 56 is a signal indicating an unsatisfactory condition of the element being monitored. For example, in the application being discussed, the presence of such a signal indicates that the gas pressure within the interior 6 of tire 5 has fallen below a predetermined desired lower limit. Thus, any warning signal received and detected by the receiver antennas 55 and 56 may be supplied to a visual or audible sensing device 66, such as a red light. If the signals emitted by antenna 52 are continuous wave signals, the lamp of alarm 66 may be an incandescent lamp. Where pulsed transmissions are employed, a gas discharge lamp such as a neon or argon lamp may be used. As will be seen, a direct or remedial control may also be operated by the signal appearing on lead 66a.

In operation, transducer 1 may be continuously interrogated or may be interrogated at the will of the operator. As will be understood from the foregoing, transducer 1 is interrogated by directing high carrier frequency energy from antenna 52 toward antenna 9 for its interception thereby; at the same time, low frequency energy from inductance antenna 67 is directed toward the low frequency transducer inductive antenna 16. It will be obvious to those skilled in the art that carrier generator 51 and low frequency generator 64 may be keyed on and off synchronously according to any desired schedule.

It is seen that carrier generator 51 and low frequency generator 64 both transmit energy toward transducer 1. The transducer 1 comprises a microwave or high frequency antenna 9 capable of receiving and re-radiating part of the signal generated in carrier source 51, a rectifying diode 17, inductive antenna or pick up coil 16 capable of being excited by transmissions over path 22, and a switch 14 whose open or closed state is the basic information to be yielded by the transducer 1.

If switch 14 is placed on the active contact 15a, both the high and low frequency signals are impressed across diode 17. Diode 17 is a conventional diode of the well known kind in which the effective impedance of the diode is substantially inversely proportional to the current flowing through it. Accordingly, diode 17 behaves as a load in the microwave circuit of the transducer, a load varying in impedance at a rate determined by the low frequency signal excited across inductive antenna 67. Consequently, the amplitude of the microwave signal re-radiated by antenna 9 (along paths 57 and 58, for example) varies at the rate of the low frequency signal. On the other hand, if switch 14 is contacting the unused contact 15, the apparent reflectivity of the transducer antenna 9 remains substantially constant, there being no internal path for the flow of rectified or other currents in transducer 1.

Any carrier signal energy flowing along paths 57 and 58 is collected by the respective antennas 55 and 56. Energy collected by antenna 55 is mixed in autodyne fashion in mixer 53 with a sample of the carrier power transmitted by antenna 52. The same process is simultaneously occurring in antenna 56 and mixer 54, antennas 55 and 56 being off set as previously discussed by a distance of λ/4. Alternatively, feed line 53a may differ in length by λ/4 from the length of feed line 54a. Thus the system operates with either the antenna inputs or the carrier generator (local oscillator) signals fed to mixers 53 and 54 in phase quadrature. The outputs of mixers 53 and 54 are amplified, if amplification is required, and are synchronously detected and inspected for level by detector 65 to determine the condition of switch 14.

If switch 14 is open, indicating a satisfactory state of the tire or other element being monitored, no low frequency (1 mHz) modulation is present to be detected by synchronous detectors 62 and 63 and there is no output on lead 66a to operate alarm 66. If switch 14 closes on contact 15a, indicating an unsatisfactory state of the element being monitored, substantial low frequency modulation will be impressed on the signals re-radiated by antenna 9 along paths 57 and 58. Accordingly, there will be substantial signals on leads 65a and 65b and the largest of these will be sufficient to operate alarm 66.

It is seen that the transducer antenna 9 of the novel systems is required to respond only to one microwave frequency, permitting the use of a relatively high Q factor antenna structure which may be compact in size. Since the radiated and transponded carrier frequencies are the same, a simple and inexpensive autodyne receiver 50 may be employed with its concomitant benefits, such as a significantly improved noise figure and the savings because of no requirements for separate local oscillators and other usual receiver stages. Also, since only one microwave carrier is used, expensive microwave filters are avoided. The low frequency transponder inductive antenna or pick up 16 may be a simple loop and may generally be of a size comparable to that of the high frequency transducer antenna 9.

Figure 7:
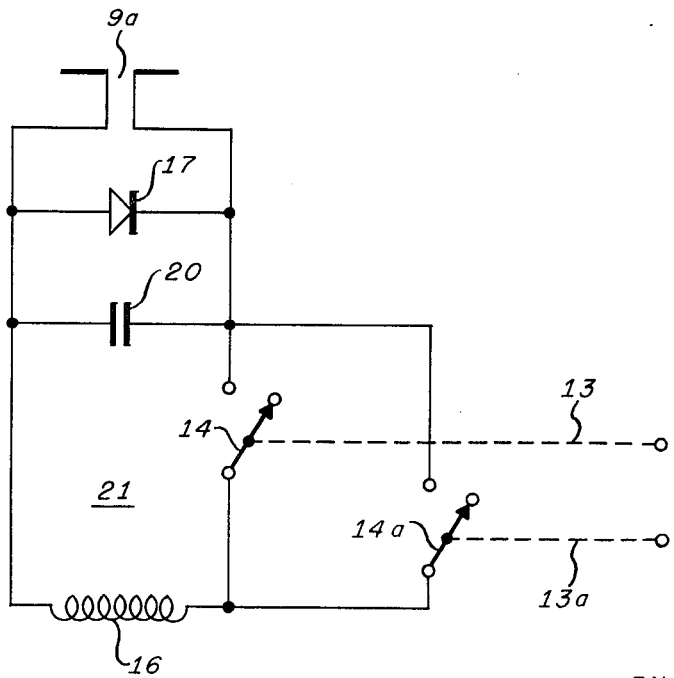

That the switch mechanism may take any of several forms will be readily apparent to those skilled in the art, and also the circuit elements of transducer 1 may be successfully rearranged in several ways appropriate for performing the transducer function. For example, the pressure switch elements 12, 13, and 14 of FIGS. 1, 2, and 3 may be located directly on a tire valve stem. The versatility of the invention is further illustrated in FIGS. 5, 6, and 7, wherein it is seen that the switch 14 may be placed in series with the current return path, may shunt the resonant tank circuit 21, or may be placed so as simultaneously to isolate the diode 17 and to detune the resonant circuit 21. Such alternative configurations permit wide choice, for example, of the location of the pressure switch. In FIG. 7, a pair of parallel switches 14 and 14a is illustrated, actuated by the respective mechanical links 13 and 13a. Such multiple switches may be used in a dual-tire wheel assembly, so that only one transducer circuit and only one dipole antenna 92 is needed for simultaneously monitoring both tires of the assembly.

It will be evident to those skilled in the art that novel transducer systems according to the present invention may be realized using various modifications of the arrangements illustrated in the several figures. It will furthermore readily be observed by those skilled in the art that forms of the novel system may be successfully demonstrated using either pulsed or continuous wave transmissions. It is seen that the novel condition monitor may be used in a wide variety of situations to provide information as to first and second or satisfactory and unsatisfactory states of monitored devices. The versatility of the concept is illustrated by the fact that it may be used continuously or intermittently to monitor the conditions of stationary or of moving elements of apparatus. It may be incorporated in total as a permanent part of such equipment, or may be used with portable test facilities or with facilities such as may be located along a route of a vehicle, for example. In particular, it provides means for evaluation of the condition or conditions of elements of rotating or translating machinery in an inexpensive and efficient manner.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Apparatus for monitoring the condition of a device at a first station having first and second possible conditions comprising:

transducer means at said first station adapted to be excited by space transmission of a high carrier frequency signal and a low frequency modulation signal for space radiation of said high frequency carrier signal modulated by said low frequency modulation signal only when said device is in said first possible condition, monitoring apparatus at a second station comprising:

oscillator detector means for generation and space radiation toward said first station of said high frequency carrier signal and for detecting said modulated high frequency carrier signal, low frequency signal generator means for generation and radiation toward said first station of said low frequency modulation signal, synchronous detector means responsive to said low modulation frequency generator means and to said oscillator detector means for producing an output only when said device is in said first possible condition, and utilization means responsive to said synchronous detector output.

2. Apparatus as described in claim 1 wherein said utilization means comprises alarm means.

3. Apparatus as described in claim 1 wherein said utilization means comprises actuator means for operating remedial control means.

4. Apparatus as described in claim 1 additionally including means for frequency modulating said high carrier frequency.

5. Apparatus for monitoring the condition of a device at a first station having first and second possible conditions comprising:

transducer means at said first station adapted to be excited by space transmission of a high carrier frequency signal and a low frequency modulation signal for space radiation of said high frequency carrier signal modulated by said low frequency modulation signal only when said device is in said first possible condition, monitoring apparatus at a second station comprising:

carrier signal generator means for generation and space radiation toward said first station of said high frequency carrier signal, low frequency signal generator means for generation and radiation toward said first station of said low frequency modulation signal, receiver means for receiving said modulated high frequency carrier signals, synchronous detector means responsive to said receiver means and to said low frequency signal generator means, and utilization means responsive to said synchronous detector means when said device is in said first possible condition.

6. Apparatus as described in claim 5 wherein said receiver means comprises:

first and second antenna means for receiving said modulated high frequency carrier signals, and first and second signal mixer means respectively responsive to said first and second antenna means and to said carrier signal generator means for providing outputs in 90 degree phase quadrature.

7. Apparatus as described in claim 6 wherein said synchronous detector means comprises first and second synchronous detector means respectively responsive to said first and second signal mixer means and to said low frequency signal generator means.

8. Apparatus as described in claim 7 additionally including largest signal detector means responsive to said first and second synchronous detector means for providing an output to said utilization means.

9. Apparatus as described in claim 5 wherein said utilization means comprises alarm means.

10. Apparatus as described in claim 5 wherein said utilization means comprises actuator means for operating remedial control means.

11. Apparatus as described in claim 5 wherein said transducer means comprises:

dipole antenna means for receiving and coupling said high carrier frequency signal across diode means, switch means responsive to said first or second condition of said device, and inductive low frequency antenna means resonated by capacitor means for receiving and coupling said low frequency modulation signal across said diode means when said switch is conducting in response to said first possible condition of said device for causing said dipole antenna means to radiate said modulated high frequency carrier signal toward said receiver means.

12. Apparatus as described in claim 5 wherein said transducer means comprises:

high carrier frequency signal dipole antenna means, first and second conductor means coupled to said dipole antenna means, diode means directly connected between said first and second conductor means, inductive low frequency antenna means directly connected between said first and second conductor means, capacitor means directly connected between said first and second conductor means for forming low frequency resonant circuit means with said inductive low frequency antenna means, and switch means connected within said first conductor means for forming when conducting a series circuit including said low frequency resonant circuit means and said diode means for causing said dipole antenna means to radiate said modulated high frequency carrier signal toward said receiver means.

13. Apparatus as described in claim 5 wherein said transducer means comprises:
  dipole antenna means for receiving and coupling said high carrier frequency signal across diode means,
  switch means in shunt with said diode means, and
  inductive low frequency antenna means resonated by capacitor means for receiving and coupling said low frequency modulation signal across said diode means when said switch is nonconducting in response to said first possible condition of said device for causing said dipole antenna means to radiate said modulated high frequency carrier signal toward said receiver means.

14. Apparatus as described in claim 5 wherein said transducer means comprises:
  high carrier frequency signal dipole antenna means,
  first and second conductor means coupled to said dipole antenna means,
  diode means directly connected between said first and second conductor means,
  inductive low frequency antenna means directly connected between said first and second conductor means,
  capacitor means directly connected between said first and second conductor means for forming low frequency resonant circuit means with said inductive low frequency antenna means, and
  switch means directly connected between said first and second conductor means and responsive to said first and second possible conditions of said device.

15. Transducer apparatus for monitoring the condition of a device having first and second possible conditions comprising:
  dipole antenna means for receiving and coupling a high carrier frequency signal across diode means,
  switch means responsive to said first or second condition of said device, and
  inductive low frequency antenna means resonated by capacitor means for receiving and coupling a low frequency modulation signal across said diode means when said switch is conducting in response to said first possible condition of said device for causing said dipole antenna means to radiate a modulated high frequency carrier signal.

16. Transducer apparatus for monitoring the condition of a device having first and second possible conditions comprising:
  high carrier frequency signal dipole antenna means,
  first and second conductor means coupled to said dipole antenna means,
  diode means directly connected between said first and second conductor means,
  inductive low frequency antenna means directly connected between said first and second conductor means,
  capacitor means directly connected between said first and second conductor means for forming low frequency resonant circuit means with said inductive low frequency antenna means, and
  switch means in said first conductor means for forming when conducting a series circuit including said low frequency resonant circuit means and said diode means for causing said dipole antenna means to radiate a modulated high frequency carrier signal.

17. Transducer apparatus for monitoring the condition of a device having first and second possible conditions comprising:
  dipole antenna means for receiving and coupling a high carrier frequency signal across diode means,
  switch means in shunt with said diode means, and
  inductive low frequency antenna means resonated by capacitor means for receiving and coupling a low frequency modulation signal across said diode means when said switch is non-conducting in response to said first possible condition of said device for causing said dipole antenna means to radiate a modulated high frequency carrier signal.

18. Transducer apparatus for monitoring the condition of a device having first and second possible conditions:
  high carrier frequency signal dipole antenna means,
  first and second conductor means coupled to said dipole antenna means,
  diode means directly connected between said first and second conductor means,
  inductive low frequency antenna means directly connected between said first and second conductor means,
  capacitor means directly connected between said first and second conductor means for forming low frequency resonant circuit means with said inductive low frequency antenna means, and
  switch means directly connected to said first and second conductor means responsive to the said first and second possible conditions of said device.

* * * * *